United States Patent Office 3,032,400
Patented May 1, 1962

3,032,400
METHOD OF PRODUCING NITROGEN FLUORIDES
Frank D. Marsh, Wilmington, Del., assignor to E. I. du Pont de Nemours and Company, Wilmington, Del., a corporation of Delaware
No Drawing. Filed Jan. 14, 1960, Ser. No. 2,349
11 Claims. (Cl. 23—205)

This invention relates to a process for preparing halides of nitrogen and has as its principal object provision of a novel process for preparing nitrogen trifluoride and nitrosyl fluoride.

This application is a continuation-in-part of my copending application Serial Number 797,876, filed March 9, 1959, and now abandoned.

Nitrogen trifluoride is a relatively stable compound which is a colorless gas at ordinary temperatures and pressures. It can be condensed to a liquid at very low temperatures (about −120° C.) and will form a solid at −215 to −220° C. Nitrogen trifluoride is useful as an intermediate in the preparation of fluorocarbons, especially fluoroolefins by the process described in U.S. 2,709,186. Nitrogen trifluoride and dinitrogen difluoride are useful as polymerization catalysts for the preparation of fluorocarbon resins from fluoroolefins.

Nitrosyl fluoride, in contrast to nitrogen trifluoride, is a very reactive gas which liquefies at −56° C. Nitrosyl fluoride is useful in the preparation of oximes of cyclic ketones by reaction with cyclic hydroaromatic compounds by the process of U.S. 2,719,116. Thus, cyclohexanone oxime, a nylon (polyamide) intermediate, can be made from cyclohexane and nitrosyl fluoride.

The development of nitrogen fluorides as commercially available materials has been hindered by the lack of an economically attractive method of preparation. Thus, nitrogen trifluoride has been prepared by reaction of ammonia and elemental fluorine and by the electrolysis of selected molten fluorides. These processes yield nitrogen trifluoride in relatively poor yields and in admixture with many by-products from which it is difficult to isolate the trifluoride in pure form. A process for obtaining nitrogen trifluoride and other nitrogen fluorides in good yields and in reasonably pure state is an attractive goal.

An attractive process for preparing nitrogen fluorides, particularly nitrogen trifluoride and nitrosyl fluoride, has now been found which comprises reacting nitrous oxide ($N_2O$) with a fluorinating agent at a temperature of at least about 100° C. in an environment which is substantially unreactive with the nitrogen fluorides at the temperature of the reaction.

Moissan and Lebeau, Ann. chim. Phys. [8], 9, 221–234 (1906), subjected a mixture of fluorine and nitrous oxide to dull red heat in a glass vessel but obtained no nitrogen fluoride. Applicant has found these conditions unsuitable for the preparation of nitrogen fluorides since the environment is reactive with nitrogen fluorides. As shown in subsequent Examples 27, and 34–36, no $NF_3$ or NOF is obtained when fluorine and nitrous oxide are passed through a glass reactor at 400–700° C.

The fluorinating agents employed can be single pure materials or they may be mixtures of two or more materials. Examples of typical fluorinating agents are elemental fluorine, cobalt trifluoride, and chlorine trifluoride. Elemental fluorine and cobalt trifluoride or mixtures of these two materials are preferred fluorinating agents. These fluorinating agents react smoothly with nitrous oxide and give good yields of nitrogen trifluoride and nitrosyl fluoride.

The process is essentially a reaction of two components, i.e., nitrous oxide and a fluorinating agent. The presence of a substantial quantity of a third reactive component which is not derived from the nitrous oxide and the fluorinating agent and with which the nitrogen fluorides can react preferentially at the temperature of the reaction will lead to other reactions with the result that little or no nitrogen fluorides are obtained. By-products formed by the reaction of nitrous oxide and the fluorinating agent do not render the process inoperable and are not considered as reactive components initially present in the reaction process.

The process is conducted in the substantial absence of moisture in a zone or chamber in which the surfaces which are in contact with the reactants during the operation of the process are substantially inert to nitrogen fluorides. Thus, glass or quartz reactors must be avoided since they react with and destroy $NF_3$ and NOF at reaction temperatures. The surfaces of the reaction chamber should also be inherently unreactive to fluorine, or they should be of such a nature that they are rendered unreactive during the initial stages of the reaction.

Inert materials can be present during the process and may have a beneficial effect in maintaining a satisfactory rate of reaction. For example, non-reactive gases such as argon, helium and nitrogen can be employed with nitrous oxide and the fluorinating agent in the process. In fact, inert gases of this type are frequently used as diluents and as agents to flush the reaction zone prior to the start of the process to remove substantially all of the air or moisture which may be present.

The mechanism of the reaction is not clearly understood. The principal overall reaction can be illustrated by the following equation, but this probably represents a composite of several simultaneous and/or successive reactions.

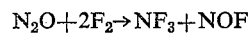
$$N_2O + 2F_2 \rightarrow NF_3 + NOF$$

The process of the invention is not necessarily limited to the reaction illustrated by the above equation, for the formation of small amounts of dinitrogen difluoride ($N_2F_2$) and nitryl fluoride ($NO_2F$) has been observed.

The reaction is generally conducted in a continuous flow process although a batch process can be used. A continuous flow process provides a convenient means of bringing the reaction products rapidly to the desired temperature and of removing nitrogen fluorides from the reaction zone as they are formed. Pressure is not a critical feature in the process; the pressure can be atmospheric or it can be higher or lower than atmospheric. Pressures up to 1000 atmospheres or higher can be employed but extremely high pressures offer no advantages. In a batch process which is generally, although not necessarily, conducted in a closed vessel, the pressure is normally autogenous, whereas in the continuous flow process the pressure is generally atmospheric or very nearly atmospheric.

The temperature at which the reaction is conducted will generally lie between about 100° and 900° C. Somewhat higher temperatures can be employed in a continuous flow process wherein the reactants are passed through the reaction zone at a high flow rate, i.e., contact time between the reactants is short. In the temperature range of 100 to about 250° C. conversions of nitrous oxide to nitrogen trifluoride and nitrosyl fluoride are low but substantial quantities are, nevertheless, obtained in this temperature range. Satisfactory yields of products are obtained between about 300° and 800° C. In general, the ratio of NOF to $NF_3$ increases with increase in $N_2O/F_2$ ratio and temperature, and NOF can be obtained as the major product in the higher temperature region (see Table III). The optimum temperature to be employed will be determined to some extent by other factors in the process, e.g., by total contact time between the reactants, rate and efficiency of heat transfer to the reaction zone, efficiency of mixing of the reactants, length of travel in the reaction zone, and the like. The preferred reaction temperature for the preparation of $NF_3$ lies between about 400° and 700° C.

The molar ratios in which the reactants are employed will determine the course of the reaction to some extent. The molar ratio of nitrous oxide to fluorinating agent, i.e., moles $N_2O$/moles fluorinating agent, can lie between about 0.1 and about 10 and can even be outside these limits, particularly when a solid fluorinating agent is employed as a packing in the reaction zone. When fluorine is employed as the fluorinating agent, a large excess of fluorine, especially in the higher temperature range can result in the production of some nitryl fluoride ($NO_2F$) along with nitrosyl fluoride and nitrogen trifluoride. When fluorine is used as the fluorinating agent, it is preferred that the molar ratio of nitrous oxide to fluorine, i.e., moles $N_2O$/moles $F_2$, be between about 0.2 and 2.0.

In a continuous flow process the rate at which the reactants are passed through the reaction zone can be varied between wide limits. The optimum rate will be determined by the length of the reactor, temperature, and the products desired.

The time of contact between the reactants will be determined to a large extent by the type of process which is used, i.e., whether it is a continuous flow or batch process. The temperature of the reaction, the efficiency of contact between the reactants and the reactivity of the fluorinating agent will have a bearing on the time necessary to obtain optimum yields of the nitrogen fluorides. Thus, the time of contact may vary from as little as 0.01 second in a continuous flow process to 10 hours or more in a batch process. Generally, in a continuous flow process the time of contact will lie between about 0.01 second and about 600 seconds. The preferred time is generally between about 5 seconds and 200 seconds. In either batch or continuous flow processes, the unreacted materials can be recovered and returned to the reaction zone.

The process of the invention is conducted in a heat resistant vessel or chamber whose inner surfaces are, as stated previously, substantially non-reactive to fluorine and the nitrogen fluorides. The extreme chemical reactivity of fluorine is well known and the many materials with which fluorine reacts have been described extensively in conventional textbooks and scientific literature. The reaction zone should be substantially free of siliceous material, e.g., quartz and glass, and of carbonaceous material, including elemental carbon. The inner surfaces of the reaction chamber, i.e., the surfaces exposed to the reaction zone, can be, e.g., nickel, Monel metal, aluminum, copper, stainless steel, alumina, or platinum. Reaction chambers of nickel and Monel metal are especially preferred.

The reaction chamber can be made of material which undergoes a surface reaction with fluorine to form a chemically inert surface film, i.e., a film which is unreactive with fluorine and the nitrogen fluorides and which inhibits any further corrosive action by the reactants. For example, aluminum oxide forms a non-reactive surface film in the presence of fluorine and surfaces coated initially with a film of this oxide are operable in the reaction zone.

Apparatus of any suitable mechanical design can be used to carry out the process. Generally, in a continuous flow process, an insulated cylindrical type reactor is employed which is equipped with inlet tubes for the reactants and exit tubes for the reaction products. The reaction chamber can, if desired, be packed with inert materials or with a solid fluorinating agent to increase the rate of heat transfer and assure maximum contact between the reactants. The chamber can be packed, e.g., with nickel turnings or nickel balls, or it can be packed with pellets of binary metal fluoride such as cobalt trifluoride and nickel difluoride. The reaction chamber can be heated to the desired temperature by any suitable means, e.g., it can be placed in a resistance furnace or induction furnace.

The manner in which the reactants are brought into contact with each other in the reaction zone is not critical. Fluorinating agents which are solids or non-volatile liquids can be charged into the reaction zone and nitrous oxide then passed over or through the fluorinating agent at the desired temperature. Alternatively, nitrous oxide and the fluorinating agent can be passed separately at controlled rates into the reaction zone which has been heated to the desired temperature. In a third alternative procedure, the reactants can be premixed in the desired proportions and the mixture can then be passed into the heated reaction zone. The last procedure, i.e., premixing the reactants, is particularly useful when fluorine is employed as the fluorinating agent. An inert gas, e.g., helium, can be used with volatile reactants as a carrier and diluent.

The volatile reaction products leaving the reaction chamber are collected in traps which are cooled to a low temperature with, e.g., liquid nitrogen. Nitrogen trifluoride and nitrosyl fluoride can be separated from the crude reaction mixture by any suitable method, e.g., by low temperature fractional distillation, fractional distillation under pressure or vapor phase chromatography. The pure nitrogen trifluoride can be stored in stainless steel, nickel or Monel metal cylinders at conventional temperatures. It is preferred to store nitrosyl fluoride in Monel metal or nickel cylinders.

The construction of a typical reactor, made of nickel, which was employed in a continuous flow process is described as follows and is illustrative of the type of reactors employed in the examples. The reactor was fabricated from a 1" x 20" (1 7/16" O.D. x 1 3/16" I.D.) nickel pipe threaded at both ends and sealed by brass pipe caps. The nickel pipe was tapped approximately 1.5" from the end and a short section of 1/4" x 1/8" nickel tube attached by means of silver solder to provide an inlet for the reactants. The pipe cap at the opposite end of the reactor was fitted with a short section of 1/4" x 1/8" nickel pipe to serve as an exit for the reaction products. A 1/4" x 1/8" thermocouple well was positioned in the center of the reactor and attached through the other pipe cap. The exit tube was joined through nickel tubing with fluorocarbon resin connections to a nickel trap cooled with liquid nitrogen. The inlet tube was joined by means of copper tubing to three rotameters through which measured quantities of fluorine, nitrous oxide and, optionally, an inert carrier gas, were passed. Helium was generally employed as a carrier gas and diluent although it was not essential for operability to use helium. The reactor was positioned in a 12" electrically heated furnace and the temperature was controlled manually by adjusting the current flow into the furnace.

The contact time, i.e., the time required by the mixed gases to pass through any given segment of the hot tube can be calculated from the dimensions and temperature of the tube, and the rate of flow of the gases given in the tables.

In a typical example, fluorine mixed with an equal volume of nitrogen or helium is passed through the reactor at a slow rate while it is being heated to the desired temperature. Nitrous oxide diluted with an excess of helium is then introduced into the mixture passing into the reactor and the flow of each gas is adjusted until the desired molar ratios are obtained. The initial reaction products are collected separately until equilibrium is established in the reactor (approximately 5 minutes). At this stage, the gases from the reactor are passed into a receiver cooled with liquid nitrogen, wherein the products condense; but most of the unreacted fluorine and the inert carrier gases pass through. At the end of the run, the reactor is flushed with helium or nitrogen and the receiver, still cooled in the liquid nitrogen trap, is evacuated to a pressure of 0.1–2 mm., thus freeing the reaction products from traces of residual fluorine.

An aliquot part of the products is analyzed by mass spectrographic procedures which indicates the total mole percent of nitrogen trifluoride, dinitrogen difluoride, nitrosyl fluoride and/or nitric oxide and other products in the reaction mixture. From these data, the percent conversion to $NF_3$, based on the fluorine or nitrous oxide passed into the system, can be calculated. The mass spectrometer analysis does not differentiate nitrosyl fluoride from nitric oxide, but further analysis by infrared identifies this component as nitrosyl fluoride.

Pure nitrogen trifluoride is isolated from the reaction mixture by scrubbing first with aqueous sodium hydroxide to remove nitrosyl fluoride and other hydrolyzable fluorides, then with aqueous ferrous sulfate to remove nitric oxide, and finally with sulfuric acid to remove moisture. The resulting gas consisting mainly of nitrogen trifluoride with a small amount of nitrous oxide is sufficiently pure for many applications but it can be further purified by gas chromatography. For example, the product can be passed through a column packed with anhydrous porous (5 A.) sodium and calcium alumino-silicates, i.e., molecular sieves size 5 A. Both the nitrogen trifluoride and nitrous oxide are initially absorbed on the molecular sieves but the nitrogen trifluoride is then selectively displaced by the nitrous oxide and nitrogen trifluoride of 99–100% purity is obtained. When the column is completely saturated with nitrous oxide, it can be reactivated by heating at 50–100° C. and nitrous oxide of high purity is recovered. Nitrogen trifluoride can also be displaced from molecular sieves by heating to 50–100° C. or by flushing by an inert gas.

The dinitrogen difluoride ($N_2F_2$) and nitryl fluoride ($NO_2F$) present in the reaction product are determined by mass spectrographic analysis. However, this analysis, as with nitrosyl fluoride, does not distinguish $NO_2F$ from $NO_2$. The $NO_2F$ content of the reaction mixture can be established by infrared analysis.

A further determination of the nitrosyl fluoride and/or nitryl fluoride content of the reaction mixture can be made by analysis of the alkaline scrub liquids, which result from the isolation of pure nitrogen trifluoride, for total fluoride ion since these components are completely hydrolyzed by dilute aqueous alkaline solutions.

The process is further illustrated by the following specific examples in which parts by weight are given in grams and parts by volume in cm.³ corrected to 0° C. and 760 mm. pressure.

EXAMPLES 1–9

These examples illustrate the reaction of nitrous oxide and fluorine in various proportions. Following the procedure described above, $N_2O$ and $F_2$ were passed through a 20″ nickel pipe (17/16″ O.D. x 13/16″ I.D.) fitted as previously described and heated by a 12″ resistance furnace centrally positioned on the tube. The experimental details are shown in Table I.

The temperatures given in the following tables are the maximum temperatures measured in the thermocouple well but the effective reaction zone extends throughout the heated portion of the tube. The temperature-gradient of the reaction zone of the tube is determined under actual reaction conditions (nitrous oxide, 37 cc./min.; helium, 31 cc./min.; and fluorine, 78 cc./min., flowing through the tube) by temperature readings in the thermocouple well at various locations in the tube as follows:

| Distance (inches) from Entrance of Furnace | Temperature (° C.) |
|---|---|
| 0 | 384 |
| 1 | 465 |
| 2 | 539 |
| 3 | 607 |
| 4 | 660 |
| 5 | 696 |
| 6 | 712 |
| 7 | 709 |
| 8 | 697 |
| 9 | 664 |
| 10 | 614 |
| 11 | 569 |
| 12 | 516 |

*Table I*

SYNTHESIS OF NITROGEN TRIFLUORIDE AND NITROSYL FLUORIDE FROM NITROUS OXIDE AND FLUORINE IN VARIOUS RATIOS

| Example | Reactants | | | | Conditions | | Products | | | |
|---|---|---|---|---|---|---|---|---|---|---|
| | $N_2O/F_2$ Mole Ratio | $N_2O$ (moles/min.) | $F_2$ (moles/min.) | He (cc./min.) | Temp.[1] (° C.) | Time[2] (min.) | Total Weight (g.) | $NF_3$[3] Mole percent | $NF_3$[4] (g.) Isolated | NOF[5] (g.) |
| 1 | 1/0.5 | 0.00260 | 0.00130 | 31 | 696 | 40 | 6.1 | 18.5 | | |
| 2 | 1/0.59 | 0.00558 | 0.00320 | 120 | 702 | 15 | 5.3 | 27.3 | 1.52 | 2.36 |
| 3 | 1/0.86 | 0.00560 | 0.00480 | 137 | 698 | 52 | 18.5 | 30.5 | 7.1 | 6.25 |
| 4 | 1/0.99 | 0.00442 | 0.00440 | 58 | 708 | 52 | 15.5 | 35.0 | 6.04 | 7.07 |
| 5 | 1/1.2 | 0.00344 | 0.00405 | 31 | 702 | 30 | 8.1 | 42.5 | 3.27 | 3.75 |
| 6 | 1/1.5 | 0.00165 | 0.00254 | 31 | 693 | 35 | 4.7 | 48.0 | 1.44 | 1.37 |
| 7 | 1/2.1 | 0.00165 | 0.00348 | 31 | 701 | 30 | 4.0 | 52.0 | 1.92 | 0.85 |
| 8 | 1/3.6 | 0.00491 | 0.00130 | 34 | 702 | 65 | [6] 12.0 | 45.0 | | |
| 9 | 1/1.7 | 0.00165 | 0.00272 | 31 | 703 | 69 | 9.01 | 42.0 | | (?) |

[1] Maximum temperature measured in thermocouple well.
[2] Total time of run.
[3] Mole percent $NF_3$ in reaction mixture based on mass spectral analysis.
[4] Grams $NF_3$ isolated as described.
[5] Grams NOF based on total hydrolyzable fluorides.
[6] Also contained 1.7 mole percent $N_2F_2$, 7.3 mole percent NOF, and 8.1 mole percent $NO_2F$ as shown by mass spectral analysis. The identity of the NOF and $NO_2F$ was confirmed by infrared analysis.
[7] A portion of the crude-product was treated at room temperature with $SiF_4$ and $(NO)_2SiF_6$, a white solid was obtained, thus indicating the presence of NOF. *Anal.*—Calc'd for $N_2O_2SiF_6$: Si, 13.53; F, 57.46. Found: Si, 13.63; F, 54.95.

EXAMPLES 10–11

These examples illustrate the reaction of nitrous oxide and fluorine in the absence of a carrier gas. The nickel reactor of Examples 1–9 was used. The products were analyzed by means of the mass spectrograph and/or infrared as previously described. Details of these examples are summarized in Table II.

EXAMPLES 12–21

These examples illustrate the reaction of nitrous oxide and fluorine at various temperatures in the presence of an inert carrier gas, helium. The nickel reactor used in Examples 1–9 was employed. The products were analyzed by means of the mass spectrograph and/or infrared. The results of these examples are shown in Table III.

EXAMPLES 22-26

These examples illustrate the process employing nitrous oxide and fluorine with a carrier gas (helium) and in the presence of a binary metal fluoride. A nickel reactor similar to that of Examples 1-9, filled with powdered metallic fluorides was employed. The results of these examples are shown in Table IV. Analyses were made by means of the mass spectrograph and/or infrared.

*Table II*

REACTION OF NITROUS OXIDE AND FLUORINE IN THE ABSENCE OF A CARRIER GAS

| Example | Parts by g./min. $N_2O$ | Parts by cc./min. Fluorine | Molar Ratio $N_2O/F_2$ | Total Time (Min.) | Temp. of Reaction (° C.) | Product | | |
|---|---|---|---|---|---|---|---|---|
| | | | | | | Weight (g.) | Mole Percent $NF_3$ | Other Products Identified |
| 10 | 0.136 | 116 | 1/1.57 | 31 | 702 | 6.85 | 41.3 | NOF and $NO_2F$. |
| 11 | 0.13 | 58 | 1/0.81 | 45 | 700 | 10.67 | 36.5 | NOF and $NO_2F$. |

*Table III*

REACTION OF NITROUS OXIDE AND FLUORINE AT VARIOUS TEMPERATURES

| Examples | Feed Rate | | | Molar Ratio $N_2O/F_2$ | Total Time (Min.) | Temperature of Reaction (° C.) | Total Reaction Products | | |
|---|---|---|---|---|---|---|---|---|---|
| | Parts by g./Min. $N_2O$ | Parts by cc./Min. | | | | | Weight (g.) | Mole percent $NF_3$ | Other Products Mole Percent |
| | | $F_2$ | He | | | | | | |
| 12 | 0.091 | 43 | 65 | 1/0.88 | 33 | 106-118 | 4.69 | (¹) | Not determined. |
| 13 | 0.091 | 35 | 40 | 1/0.71 | 40 | 204 | 4.93 | 0.1 | $N_2O$, 99. |
| 14 | 0.068 | 58 | 35 | 1/1.57 | 30 | 495-500 | 1.93 | 0.9 | $N_2O$, 86.7. |
| 15 | 0.070 | 54 | 37 | 1/1.48 | 33 | 600 | 4.63 | 13.5 | $N_2O$, 80. |
| 16 | 0.068 | 58 | 35 | 1/1.57 | 24 | 602 | 3.64 | ² 38.6 | $N_2O$, 41.5; $NO_2F$, 18.2. |
| 17 | 0.068 | 58 | 35 | 1/1.57 | 38 | 695-700 | 4.45 | 26.9 | NOF, 38.0; $N_2O$, 27.0; $NO_2F$, 3.9. |
| 18 | 0.068 | 58 | 35 | 1/1.57 | 30 | 702-706 | 4.20 | ³ 60.6 | NOF, 23.5; $NO_2F$, 12.4. |
| 19 | 0.041 | 29 | 30 | 1/1.29 | 46 | 704 | 4.53 | 29.3 | NOF, 34.5; $NO_2F$, 4.0; $N_2F_2$, trace. |
| 20 | 0.136 | 85 | 34 | 1/1.19 | 30 | 706 | 6.58 | 22.5 | NOF, 55.0; $NO_2F$, 16.7. |
| 21 | 0.068 | 58 | 37 | 1/1.57 | 32 | 794 | 1.48 | 0.8 | NOF, 42.1; $NO_2F$, 28.7. |

¹ $NF_3$ detected by strong infrared absorption at 11 μ.
² Conversion of $N_2O$ to $NF_3$ is 66% of the $N_2O$ used. Yield of $NF_3$ is 90% of $N_2O$ consumed, based on general equation previously given.
³ Conversion of $N_2O$ to $NF_3$ is 96% based on general equation previously given.

*Table IV*

REACTION OF NITROUS OXIDE AND FLUORINE IN THE PRESENCE OF BINARY METAL FLUORIDES

| Example | Feed Rate | | | Molar Ratio $N_2O/F_2$ | Metal Fluoride in Reactor (g.) | Total Time (Min.) | Temperature of Reaction (° C.) | Product | |
|---|---|---|---|---|---|---|---|---|---|
| | Parts by g./Min. $N_2O$ | Parts by cc./Min. | | | | | | Weight (g.) | Mole Percent $NF_3$ |
| | | $F_2$ | He | | | | | | |
| 22 | 0.068 | 58 | 34 | 1/1.57 | $CoF_3$ (78.4) | 35 | 508-514 | 4.11 | 0.8 |
| 23 | 0.068 | 58 | 34 | 1/1.57 | $CoF_3$ (78.4) | 42 | 608 | 4.83 | 31.5 |
| 24 | 0.068 | 58 | 34 | 1/1.57 | $NiF_2$ (29) | 34 | 516 | 6.30 | 1.2 |
| 25 | 0.068 | 58 | 34 | 1/1.57 | $NiF_2$ (29) | 30 | 590-598 | 6.22 | 22.1 |
| 26 | 0.068 | 58 | 34 | 1/1.57 | $NiF_2$ (29) | 30 | 708 | 3.15 | 49.0 |

EXAMPLE 27

This example illustrates the process employing nitrous oxide and fluorine in a nickel reactor packed with nickel turnings.

Nitrous oxide and fluorine were fed for 35 minutes into the nickel reactor of Examples 1-9, heated to 704° C. at a rate of 0.068 g./min. of nitrous oxide and 58 cc./min. of fluorine. The reactor was packed with 155 g. of nickel turnings. Approximately 37-38% of nitrous oxide was converted to nitrogen trifluoride, yield 85% based on the nitrous oxide consumed.

When the foregoing example was repeated using a glass reactor containing nickel turnings, no nitrogen trifluoride was obtained.

EXAMPLE 28

The process of this example was conducted in a 250 cc. cylindrical reactor of Monel metal which was equipped with two baffle plates and a flanged head fitted with three concentric Monel metal tubes. The inner tube, which extended to the bottom of the reactor, was sealed and served as a thermocouple well. The gas inlet tube which surrounded the thermocouple well extended nearly to the bottom of the reactor. The third tube terminated at the flange face and served as an exit for the gaseous reaction products. The reactor was mounted in a resistance furnace at a slight angle and continuously rotated at slow speed (about 60 r.p.m.) to provide a falling film of hot powdered metal fluoride for reaction with nitrous oxide. The exit tube of this reactor was connected to a gas sampling bulb and a receiver cooled in liquid nitrogen. The reactor was flushed with nitrogen and charged with a solid fluorinating agent, e.g., a binary metal fluoride. Nitrous oxide gas was passed into the reactor through the inlet tube. The reaction products were collected and purified as previously described.

A. The reactor, described above, was flushed with nitrogen gas and charged with 60 parts by weight of cobalt trifluoride. The reactor and charge were heated to an internal temperature of 600-653° C. and nitrous oxide was passed through the reaction zone at about 100 parts by volume per minute for 55 minutes. Mass spectographic analysis of the volatile reaction products showed that it contained $NF_3$, $N_2F_2$, NOF and unidentified products. The reaction products were condensed to a liquid in a trap cooled with liquid nitrogen, and the nitrogen trifluoride was further identified in the liquid reaction products by infrared analysis.

B. The reactor was charged with 65 parts of cobalt trifluoride and heated to 580–628° C. Nitrous oxide was passed through at a rate of 100 parts by volume per minute for 40 minutes. There was obtained 4.78 parts of reaction products from which nitrogen trifluoride was separated by vapor phase chromatography. The reaction products contained nitrosyl fluoride and unreacted nitrous oxide.

C. The reactor was charged with 65 parts of cobalt trifluoride and heated to 626–656° C. Nitrous oxide was passed through at a rate of 20 parts by volume per minute for 35 minutes. There was obtained 0.66 part of reaction product from which nitrogen trifluoride was isolated by vapor phase chromatography.

EXAMPLES 29–36

These examples illustrate the operation of the process in reactors of typical materials other than nickel. The results are shown in Table V. It will be noted that no $NF_3$ or NOF were obtained in Examples 34–36 which were carried out in glass reactors. The reaction products were analyzed by mass spectrographic and infra-red methods.

of the process in a 44" x 1.5" I.D. nickel tubular reactor, constructed with thermocouples located in the center of the reactor at points 10", 18", 26" and 34" from the entrance.

Nitrous oxide and fluorine were simultaneously fed into the heated reactor for 45 minutes at rates of 256 cc./min. and 188 cc./min., respectively. The temperature profile of the reactor measured by the thermocouples, reading from the entrance, was 238° C., 330° C., 700° C. and 361° C. The reaction products were collected in the usual way in a receiver cooled in liquid nitrogen. At the end of the run, the by-product nitrogen and oxygen were pumped out of the liquid nitrogen cooled receiver leaving as a residue a composition which was shown by infrared analysis to contain 93 mole percent NOF with a small amount of $NF_3$ and traces of $NO_2F$, $N_2O$ and $NO_2$.

EXAMPLE 39

The preceding example was repeated using nitrous oxide and fluorine fed at rates of 35 cc./min. and 90 cc./min., respectively. The temperature profile of the reactor, measured as described above, was 554° C., 649° C., 649° C., and 693° C. The crude product, as obtained directly from the reactor, was composed of 19 mole percent $NF_3$, 24 mole percent NOF, 41 mole percent $F_2$,

*Table V*

TREATMENT OF NITROUS OXIDE WITH FLUORINE IN REACTORS CONSTRUCTED OF MATERIALS OTHER THAN NICKEL

| Example | Reactor Material | Parts by g./Min. $N_2O$ | Parts by cc./Min. $F_2$ | Parts by cc./Min. He | Molar Ratio $N_2O/F_2$ | Total Time (Min.) | Temp. of Reaction (° C.) | Product Weight (g.) | Product Mole percent $NF_3$ | Product Mole percent NOF |
|---|---|---|---|---|---|---|---|---|---|---|
| 29 | Fused alumina [1] | 0.068 | 58 | 34 | 1/1.57 | 30 | 670 | 4.94 | 24 | 18.5. |
| 30 | ----do. [1] | 0.11 | 58 | 34 | 1/0.97 | 30 | 740 | 6.35 | 23 | 54.5. |
| 31 | Copper | 0.11 | 58 | 34 | 1/0.97 | 30 | 697 | 4.61 | 37.3 | 15. |
| 32 | Stainless steel | 0.11 | 58 | 34 | 1/0.97 | 30 | 706–716 | 5.48 | 16.5 | Not determined. |
| 33 | Aluminum | 0.11 | 58 | 34 | 1/0.97 | 30 | 600 | 6.86 | 0.2 |  |
| 34 | Glass [2] | 0.068 | 58 | 26 | 1/1.6 | 32 | 398 | 5.35 | None [3] | None. |
| 35 | ----do. [2] | 0.068 | 58 | 34 | 1/1.6 | 32 | 607 | 7.03 | ---do.[3] | None. |
| 36 | ----do. [2] | 0.068 | 58 | 34 | 1/1.6 | 32 | 716 | 6.05 | ---do.[3] | None. |

[1] Impervious recrystallized alumina (99.7% $Al_2O_3$).
[2] "Vycor" brand heat resistant glass.
[3] Analysis by infrared (11.0 μ) in a 10 cm. cell at pressures varying from 29 to 400 mm. and by gas chromatography failed to show any nitrogen fluorides. By mass spectrographic analysis the reaction products included $SiF_4$, $Si_2OF_6$, $N_2O$, $CO_2$ and $N_2$.

EXAMPLE 37

This example illustrates the operation of the process by a batch method.

A pressure vessel (capacity, 145 parts by volume) lined with stainless steel was flushed with nitrogen and charged with 60 parts by weight of cobalt trifluoride. The vessel was sealed and then charged with 25 parts by weight of nitrous oxide. The vessel and contents were heated with agitation (rocker-type unit) at 340–350° C. for one hour at a pressure of 520–535 atmospheres. Nitrous oxide was injected intermittently in sufficient quantity to maintain this pressure. The temperature was increased to 472–486° C. and additional nitrous oxide injected from time to time to maintain the pressure at 665–715 atmospheres for an additional 2.5 hours. The vessel was cooled to about 25° C. and the reaction products were transferred to a stainless steel cylinder. Nitrogen trifluoride was separated from the products by vapor-phase chromatography employing an activated alumina column at 0° C.

Chlorine trifluoride ($ClF_3$, 26 g.) and nitrous oxide (31 g.) were reacted at a temperature of 400° C. under a pressure of 300 atmospheres for one hour by the procedure described in Example 37. Nitrogen trifluoride was identified by infrared analysis of the reaction mixture.

EXAMPLE 38

This and the following example illustrates the operation 11 mole percent $N_2$, 4 mole percent oxygen and 0.1 mole percent $N_2O$.

Since obvious modifications in the invention will be evident to those skilled in the chemical arts, I propose to be bound solely by the appended claims.

The embodiments of the invention in which an exclusive property or privilege is claimed are defined as follows:

1. In the production of nitrogen fluorides, the step which comprises reacting nitrous oxide with fluorine at a temperature of at least 100° C. and in an environment inert to nitrogen fluorides.

2. In the production of nitrogen fluorides, the step which comprises reacting nitrous oxide with cobalt trifluoride at a temperature of at least 100° C. and in an environment inert to nitrogen fluorides.

3. In the production of nitrogen fluorides, the step which comprises reacting nitrous oxide with fluorine and cobalt trifluoride at a temperature of at least 100° C. and in an environment inert to nitrogen fluorides.

4. The process which comprises heating nitrous oxide with at least one inorganic fluorinating agent of the group consisting of fluorine, cobalt trifluoride and chlorine trifluoride at a temperature of about 100 to 900° C. in an environment inert to nitrogen trifluoride and thereby producing at least one nitrogen fluoride of the group consisting of nitrogen trifluoride, nitrosyl fluoride and dinitrogen difluoride.

5. The process of claim 4 wherein the reactor is made of nickel.

6. The process of claim 4 wherein the reactor is packed with a particulate member of the group consisting of metallic nickel and binary metallic fluorides.

7. The process of claim 4 wherein the fluorinating agent is fluorine and the fluorine and nitrous oxide are mixed with an inert carrier gas.

8. The process which comprises heating nitrous oxide with fluorine at a temperature of about 100 to 900° C. in an environment inert to nitrogen trifluoride and thereby producing nitrogen trifluoride.

9. The process which comprises passing a mixture of nitrous oxide and fluorine through an inert reactor at a temperature of at least 100° C. and thereby producing nitrogen fluorides.

10. The process which comprises contacting nitrous oxide with cobalt trifluoride heated to a temperature of 100 to 900° C. in an environment inert to nitrogen fluorides and thereby producing nitrogen fluorides.

11. The process of claim 4 including the subsequent step of recovering a nitrogen fluoride from the reaction mixture.

References Cited in the file of this patent

Faloon et al.: "The Preparation of Nitrosyl Fluoride and Nitryl Fluoride," Journal of the American Chemical Society, vol. 73, No. 6, June 1951, pages 2937–2938.